Sept. 28, 1954

M. J. BERLYN 2,690,356

FUEL INJECTION APPARATUS

Filed May 23, 1952

INVENTOR.
MARTIN J. BERLYN

BY
Raymond A. Paquin
ATTORNEY.

Sept. 28, 1954     M. J. BERLYN     2,690,356
FUEL INJECTION APPARATUS

Filed May 23, 1952     13 Sheets-Sheet 2

INVENTOR.
MARTIN J. BERLYN
BY
ATTORNEY.

Sept. 28, 1954  M. J. BERLYN  2,690,356
FUEL INJECTION APPARATUS
Filed May 23, 1952  13 Sheets-Sheet 3

INVENTOR.
MARTIN J. BERLYN
BY
ATTORNEY.

Sept. 28, 1954

M. J. BERLYN 2,690,356

FUEL INJECTION APPARATUS

Filed May 23, 1952

INVENTOR.
MARTIN J. BERLYN

BY *Raymond A. Paquin*

ATTORNEY.

Sept. 28, 1954  M. J. BERLYN  2,690,356
FUEL INJECTION APPARATUS
Filed May 23, 1952  13 Sheets-Sheet 5

INVENTOR.
MARTIN J. BERLYN
BY Raymond A. Paquin
ATTORNEY.

Sept. 28, 1954 M. J. BERLYN 2,690,356
FUEL INJECTION APPARATUS
Filed May 23, 1952 13 Sheets-Sheet 9

INVENTOR.
MARTIN J. BERLYN
BY Raymond A. Paquin
ATTORNEY.

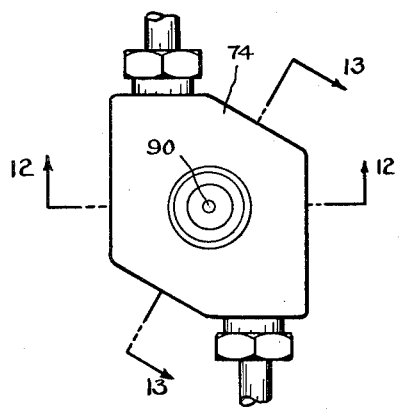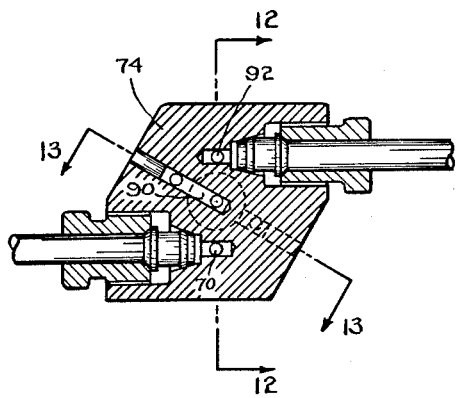
Fig.11.    Fig.14.
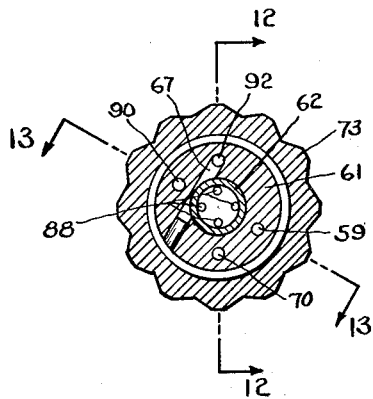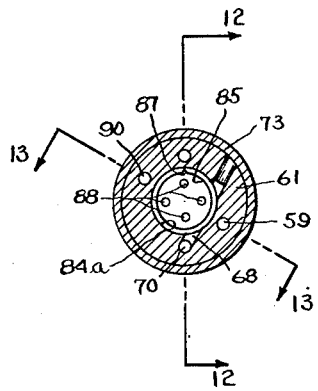
Fig.15.    Fig.16.
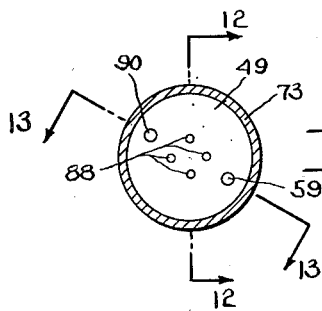
Fig.17.
INVENTOR.
MARTIN J. BERLYN
BY Raymond A. Paquin
ATTORNEY.

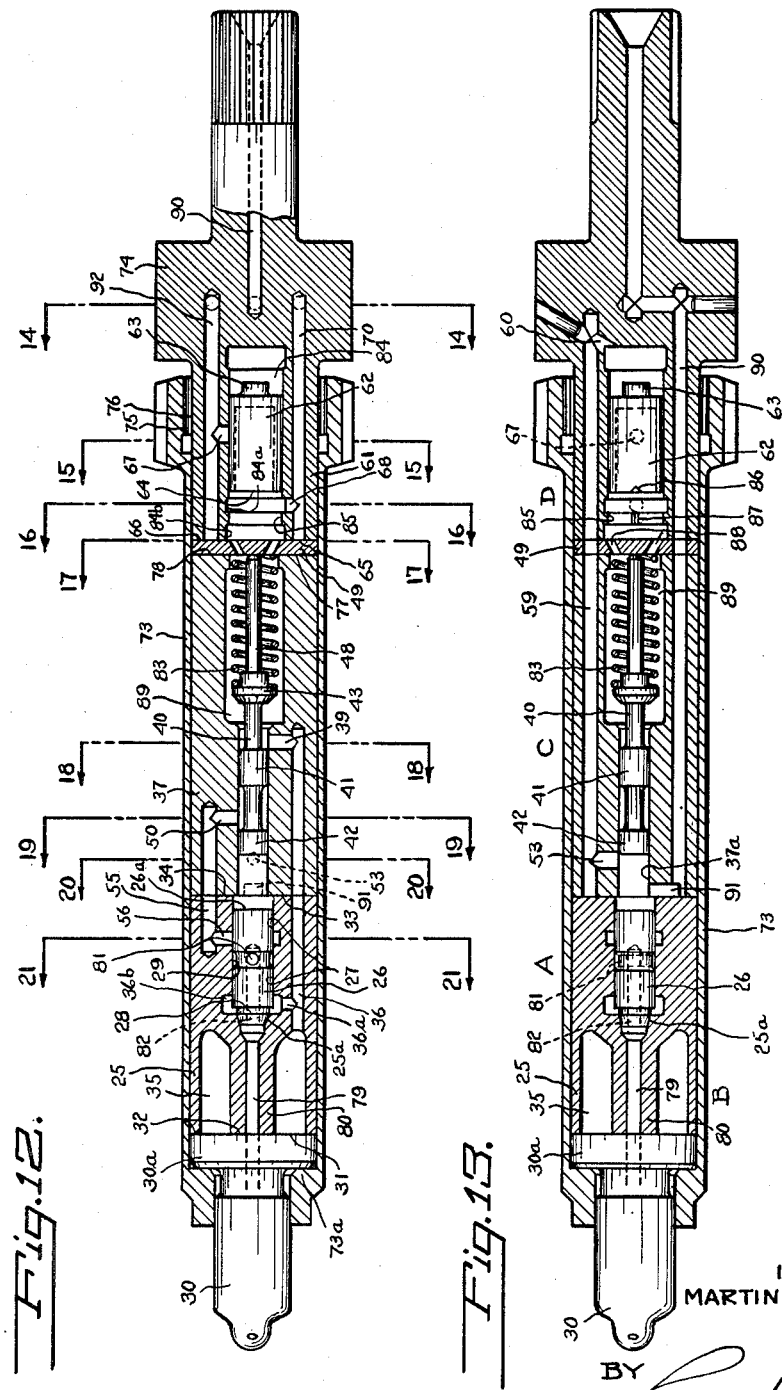

Sept. 28, 1954  M. J. BERLYN  2,690,356
FUEL INJECTION APPARATUS
Filed May 23, 1952  13 Sheets-Sheet 13

INVENTOR.
MARTIN J. BERLYN
BY Raymond A. Paquin
ATTORNEY.

Patented Sept. 28, 1954

2,690,356

UNITED STATES PATENT OFFICE 2,690,356

FUEL INJECTION APPARATUS

Martin J. Berlyn, Suffield, Conn., assignor to American Locomotive Company, New York, N. Y., a corporation of New York Application May 23, 1952, Serial No. 289,572

15 Claims. (Cl. 299—107.8)

This invention relates to internal combustion engines, or the like, and has particular reference to new and improved fuel injection apparatus therefor.

This invention relates to the form of fuel injection apparatus disclosed in my application, Serial No. 43,145 filed August 7, 1948, now Patent No. 2,625,436, and particularly to the provision of a form of the invention which is embodied in an envelope which will permit it to be used for replacement in existing engines of currently employed conventional injection equipment without necessitating any change in the structure of existing engines to which this may be applied and also this embodiment is such that all components conform to conventional manufacturing requirements and do not call for any manufacturing techniques other than those which have been developed by the injection equipment industry.

An object of the invention is to provide a new and improved fuel injection apparatus for internal combustion engines, or the like, which apparatus is particularly adapted for use with crude fuels such as low quality liquid fuels and suspensions of finely pulverized solid fuels, such as coal, in liquid vehicles.

Another object of the invention is to provide a fuel injection apparatus which will achieve rapid injection and fine division of fuel particles without recourse to high pressures.

Another object of the invention is to provide a fuel injection apparatus with which it is possible to achieve a constant pressure combustion cycle and thereby avoid the great cylinder pressures and combustion shock which create such structural and mechanical problems in conventional or contemporary high-output compression-ignition engines working on the constant-volume cycle of combustion.

Another object of the invention is to provide a fuel injection apparatus which takes up less space in critical regions of the cylinder head.

Another object of the invention is to provide fuel injection apparatus which avoids all of the mechanical complication and numerous operators previously required with conventional constructions to actuate the fuel valve and controls of engines employing blast-injection systems.

Another object of the invention is to provide a new and improved blast type fuel injection apparatus.

Another object of the invention is to provide a new and improved blast type fuel injection apparatus and which may be operated using air or steam for the blast and which is particularly well adapted for use with steam and is not subject to trouble from condensation even when starting from cold.

Another object is to provide a fuel injection system of the blast type wherein exhaust heat from the engine may be used for generating blast steam when the engine is running.

Another object is to provide a blast type fuel injection system which, when employed with steam as a blast vapor, there may be achieved the smooth combustion of the air-blast engine without the disadvantage associated with the use of an air compressor.

Another object is to provide a blast type fuel injection system wherein the amount of blast vapor per cycle is independent of engine speed, thus giving the system when applied to variable speed engines, a great advantage over previous blast injection systems.

Another object is to provide a new and improved fuel injection apparatus which may be employed with both compression ignition engines and spark ignition engines with the same advantages.

Another object is to provide a new and improved blast injection apparatus utilizing superheated steam.

It is the principal object of this invention to provide new and improved fuel injection apparatus of the type and for the purpose set forth, which apparatus is capable of embodiment in an envelope which will permit its use for replacement of currently employed conventional injection equipment in existing engines without necessitating any change in the structure of existing engines to which it may be applied and also which is of such construction and form that all components conform to conventional manufacturing requirements and do not require any manufacturing techniques other than those which have been developed by and are used in the injection equipment industry.

Other objects and advantages of the invention will be apparent from the following description taken in connection with the accompanying drawings. Many changes may be made in the details of construction and arrangement of parts shown and described.

Referring to the drawings.

Figure 1:
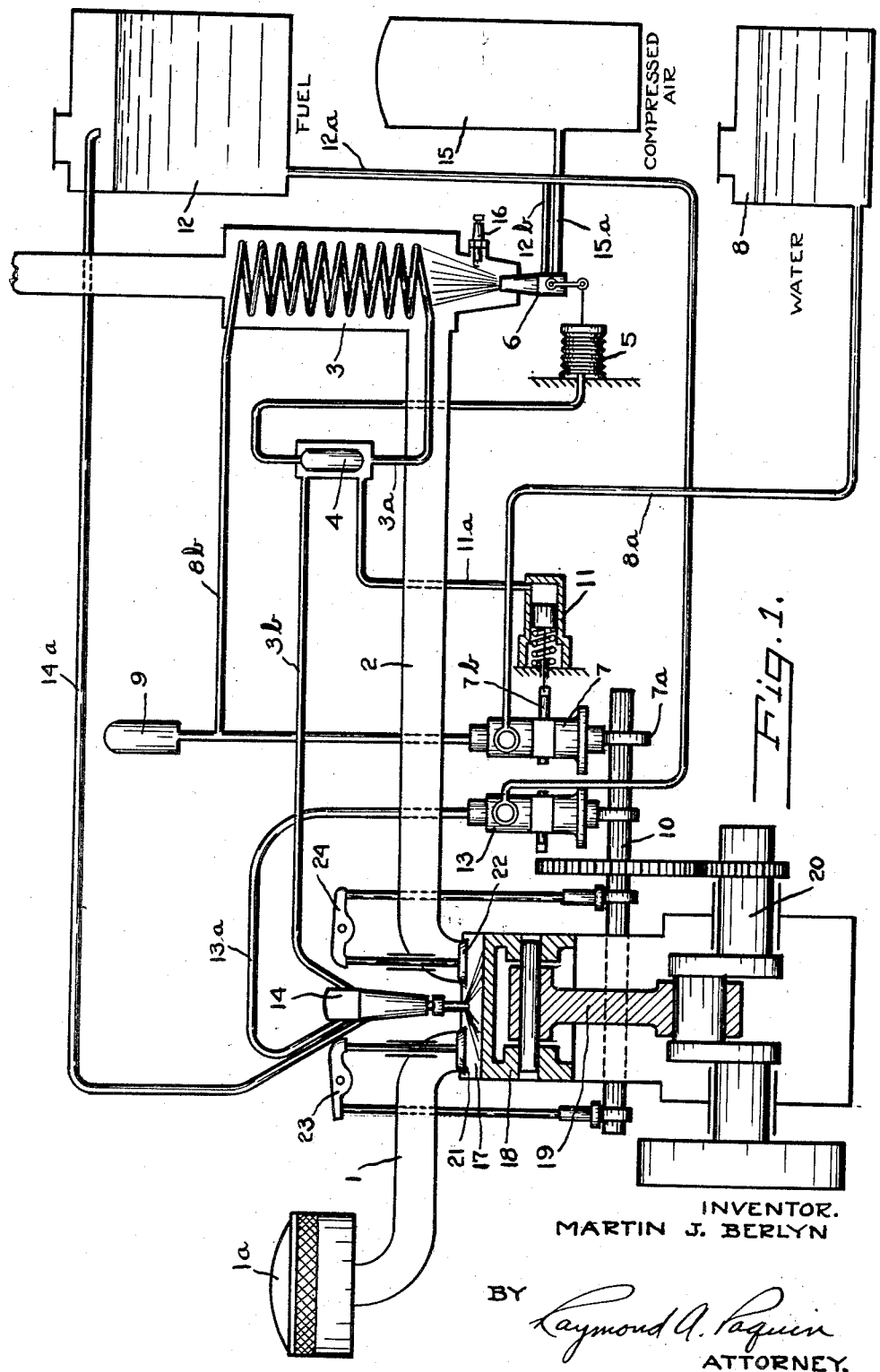
Fig. 1 is a fragmentary diagrammatic view of an engine embodying the invention.
Figure 18:
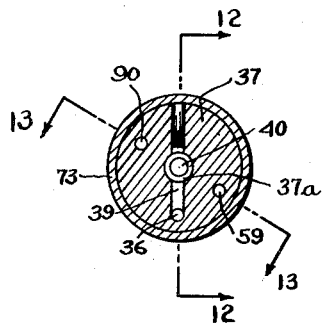
Figure 19:
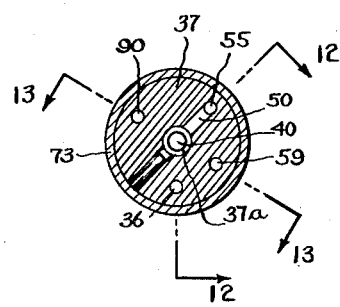
Figure 20:
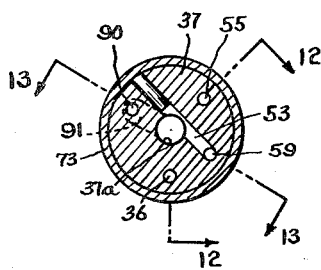
Figure 21:
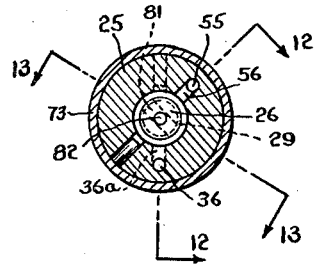
Figure 22:
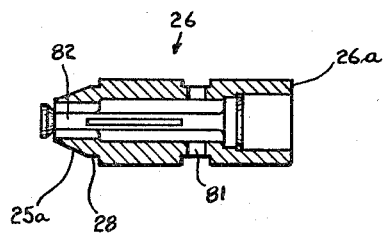

Figs. 3 to 6 inclusive are diagrammatic views of the system shown in Fig. 1 but showing the same at various points in its operation;

Figs. 7 to 10 inclusive are diagrammatic views generally similar to Figs. 2 to 6 inclusive, but illustrating the sequences of failure of various elements of the injection system;

Fig. 11 is a top or plan view of the preferred embodiment of my invention;

Fig. 12 is a sectional view taken on line 12—12 of Fig. 11, looking in the direction of the arrows;

Fig. 13 is a sectional view taken on line 13—13 of Fig. 11, looking in the direction of the arrows;

Fig. 14 is a sectional view taken on line 14—14 of Fig. 12, looking in the direction of the arrows;

Fig. 15 is a sectional view taken on line 15—15 of Fig. 12, looking in the direction of the arrows;

Fig. 16 is a sectional view taken on line 16—16 of Fig. 12, looking in the direction of the arrows;

Fig. 17 is a sectional view taken on line 17—17 of Fig. 12, looking in the direction of the arrows;

Fig. 18 is a sectional view taken on line 18—18 of Fig. 12, looking in the direction of the arrows;

Fig. 19 is a sectional view taken on line 19—19 of Fig. 12, looking in the direction of the arrows;

Fig. 20 is a sectional view taken on line 20—20 of Fig. 12, looking in the direction of the arrows;

Fig. 21 is a sectional view taken on line 21—21 of Fig. 12, looking in the direction of the arrows; and Fig. 22 is an axially sectional view of an alternative embodiment of injection valve.

Referring more particularly to the drawings wherein similar reference characters designate corresponding parts throughout the several views, Fig. 1 is a diagrammatic view showing, by way of example, the application of the present invention when using steam as the blast vapor to one cylinder of a four-stroke cycle engine. While the application is to but a single cylinder of a four-stroke engine, the system is equally applicable to multi-cylinder engines as hereinafter set forth and is also equally applicable to two-stroke cycle engines.

In the arrangement shown in Fig. 1, 1 is the air-intake pipe and 1a the air filter of a conventional four-stroke cycle compression-ignition engine; 2 is the exhaust pipe; 3 is a conventional flash-steam boiler utilizing the exhaust heat from the engine through exhaust pipe 2 to generate high pressure superheated steam and deliver the same through pipes 3a and 3b to injector 14. A temperature-sensitive element 4 cooperates with the bellows or similar device 5 which actuates the control of fuel burner 6 in response to the temperature of the steam leaving flash boiler 3. A boiler feed pump 7 draws water from water tank 8 and pipe line 8a and delivers it under pressure through pipe line 8b to flash boiler 3. A surge-damper 9, of conventional type, is provided in the boiler feed pipe line 8b.

Water pump 7 is actuated by a cam 7a on the engine camshaft 10 and is controlled by means of a pressure-responsive device 11 so that falling steam pressure causes pump 7 to deliver feed-water to flash boiler 3 at a greater rate. The pressure-responsive device 11 is connected by pipe line 11a to the outlet from the flash boiler, such as pipe 3a or pipe 3b. The pressure-responsive device 11 is adapted to adjust pump control rack 7b to which said pressure-responsive device is connected to automatically adjust the supply of water from supply tank 8 to flash boiler 3, at a greater rate as previously described.

Fuel supply tank 12 is connected by pipe lines 12a and 12b to burner 6 and by said pipe line 12a to a conventional type fuel injection pump 13 which is adapted to deliver fuel through line 13a to injector 14, the construction and operation of which is hereinafter described. Pipe 14a is a fuel return or bypass pipe as hereinafter described.

15 is a reservoir of compressed air which is connected by a pipe 15a with burner 6 and 16 is a conventional electric igniter plug that may be energized by a conventional spark coil or ignition transformer.

The engine is provided with the usual combustion chamber or cylinder 17 into which projects injector 14 and in which is mounted the piston 18 which is connected by connecting rod 19 to crankshaft 20. Inlet valve 21 and exhaust valve 22 are adapted to be actuated by rocker levers 23 and 24 respectively and which are both actuated by cams on camshaft 10.

In operation of the engine using this injection system, a normal governor causes fuel injection pump 13 to deliver fuel to injector 14 in accordance with the requirements of the engine and blast vapor is supplied to the injector 14, in the embodiment shown in Fig. 1, by flash boiler 3. Should the engine exhaust not provide sufficient heat to maintain the desired steam temperature, the temperature-sensitive element 4 will cause bellows 5 to move the control lever of burner 6 in a direction to feed a spray of fuel and air into the flash boiler 3 and at the same time igniter-plug 16 will be energized so as to light the burner in the event that the exhaust heat in the system is insufficient to promote ignition. Should the steam pressure fall below the prescribed minimum, the spring in pressure-responsive element 11 will overcome the piston force and will cause the control rod of boiler feed pump 7 to move in a direction to increase the rate of water feed to flash boiler 3.

Burner 6 and igniter plug 16 are also used for the purpose of generating the necessary head of steam for injection when starting the engine, at which time no exhaust heat is available. When the running engine provides adequate exhaust heat for generation of steam at the required pressure and temperature, element 4 in cooperation with device 5 will shut off burner 6 and igniter plug 16.

The injector or injection system 14 and various steps in its operation is shown diagrammatically in Figs. 2 to 10 inclusive and the preferred form is shown in Figs. 11 to 22 inclusive. In this description immediately following, the numbering of the parts referred to is that which is shown in Figs. 2 to 10 inclusive. This injector or fuel injection system comprises four main functional units, namely, the injection valve, with which is associated the nozzle, and which is designated generally at A, a blast vapor accumulator designated generally at B, a shuttle valve designated generally at C and a fuel accumulator designated generally at D.

The injection valve A consists of the valve housing 25 which contains the differential valve 26 which is provided with a guide portion 27, of greater diameter than valve face extension 28, and which is also provided on its opposite end with the travel limiting boss 29.

Nozzle 30 is aligned with valve housing 25 and has the seat 31 adapted to be engaged by valve face 32 of valve 26 to control flow through nozzle 30 which is also provided with internal grooves 33 to promote turbulence of flow and orifices 34 of desired number and size to direct the spray of blast vapor and fuel into the combustion chamber of the engine.

Blast vapor accumulator B consists of a housing 35 and communicates with injection valve housing 25 through duct 36 and also communicates with housing 37 and shuttle valve C through duct 38 and port 39.

In shuttle-valve housing 37 is positioned shuttle valve 40, which is free to move axially in said shuttle-valve housing 37. The shuttle valve 40 is provided with two cylindrical lands 41 and 42 and a mushroom-type valve head 43. The lands 41 and 42 are a sliding fit in bore 44 of housing 37 and the valve head 43 is a sliding fit in counterbore 45 of housing 37. Counterbore 45 is of greater diameter than bore 44. The valve head 43 limits travel of the valve 40 in one direction by seating or abutting on seat 46 at the adjacent ends of bore 44 and counterbore 45. Shuttle-valve housing 37 is also provided with another counterbore 47 which is larger in diameter than counterbore 45.

Shuttle valve mushroom head 43 is provided with a boss 48 which limits travel in one direction by abutting against the closure 49 of housing 37.

Housing 37 is provided with ports 39, 50, 51, 52, 53 and 54. Port 39 is always open and communicates by way of duct 38, with blast vapor accumulator 35. Port 50, which may be closed by land 42 of shuttle valve 40, communicates by way of duct 55 with port 56 of injection valve housing 25. Port 51, which is always open, communicates by way of duct 57 with port 58 of injection valve housing 25. Port 52, which is always open, communicates by way of duct 13a with a conventional diesel injection pump 13 of the type which allows some reversal of fuel flow through its discharge port at the end of each injection.

Port 53 is controlled by land 42 of shuttle-valve 40, and it may be opened by either edge of the land 42 or it may be closed by the land 42 and said port 53 communicates by way of duct 59 with port 60 of the fuel accumulator housing 61 which is provided with an axially movable free piston 62 having motion-limiting bosses 63 and 64 on its opposite ends which abut against the closures 65 and 66 respectively of housing 61 at the limits of axial travel of piston 62.

Fuel accumulator housing 61 is provided with ports 60, 67, 68 and 69. Duct port 67, which communicates with overflow duct 14a is normally closed by piston 62 but may be uncovered by the piston 62 when it has travelled almost to the limit of its movement in the direction limited by abutment boss 64 against closure 66 thus allowing communication of duct 59 with duct 14a. Port 68, which is always open, is in communication with a source of high-pressure blast vapor by way of duct 70. Port 69 is normally open but may be closed by piston 62 as it travels toward the closure 66. Ports 67 and 69 are so located and the length of piston 62 is such that port 69 is closed before port 67 is opened. Port 69 communicates with port 54 of shuttle-valve housing 37 by way of duct 71. A relatively small duct 72, forming a constricted passage for blast vapor constantly connects ducts 70 and 71 at a point in duct 71 between ports 69 and 54.

Referring to Figs. 2, 3, 4, 5 and 6, the construction and functioning or operation of the system may be understood.

Figure 2:
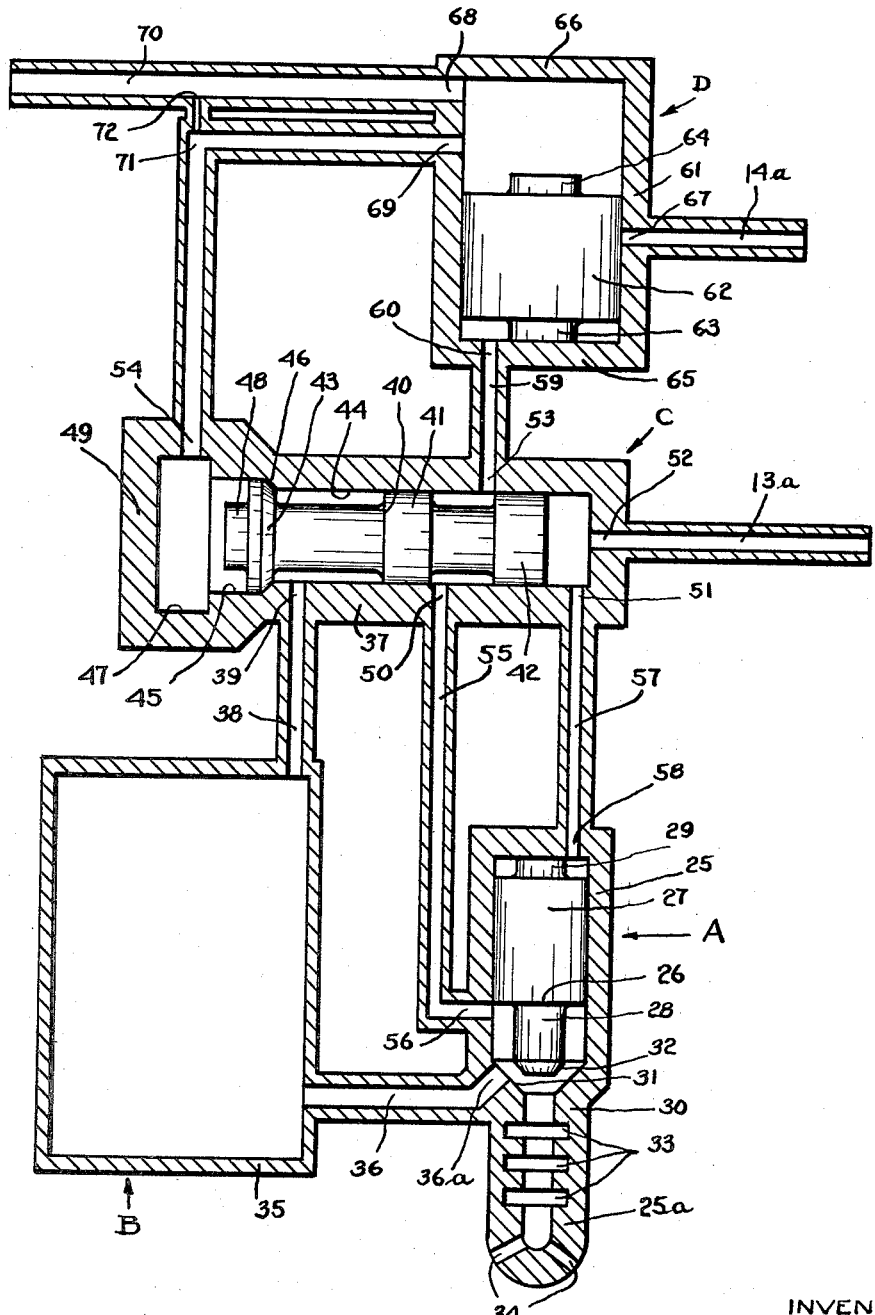
Fig. 2 is a diagrammatic view showing a fuel injection system constructed according to my invention at one point in its operation.

Fig. 2 shows valves 26 and 40 and piston 62 in the positions they assume at the end of an injection during regular cyclical operation on a running engine. Blast vapor pressure from accumulator 35, by way of duct 36 and port 36a, has forced injection valve 26 to the limit of travel permitted by abutment of boss 29 against the closure or abutment of housing 25, and valve-face 32 on valve extension 28 is clear of seating 31. Blast vapor pressure has forced mushroom head 43 of valve 40 into contact with seat 46. Blast vapor has forced piston 62 to the limit of travel permitted by abutment of boss 63 against closure 65 and fuel has been pumped by way of port 60, duct 59, bore 44, port 50, duct 55 and port 56 to nozzle 25a. Displacement of fuel by guide portion 27 of injection valve 26, also by land 42 of shuttle valve 40, has been accommodated by backflow along duct 13a as permitted by the fuel pump at the end of its delivery phase.

Figure 3:
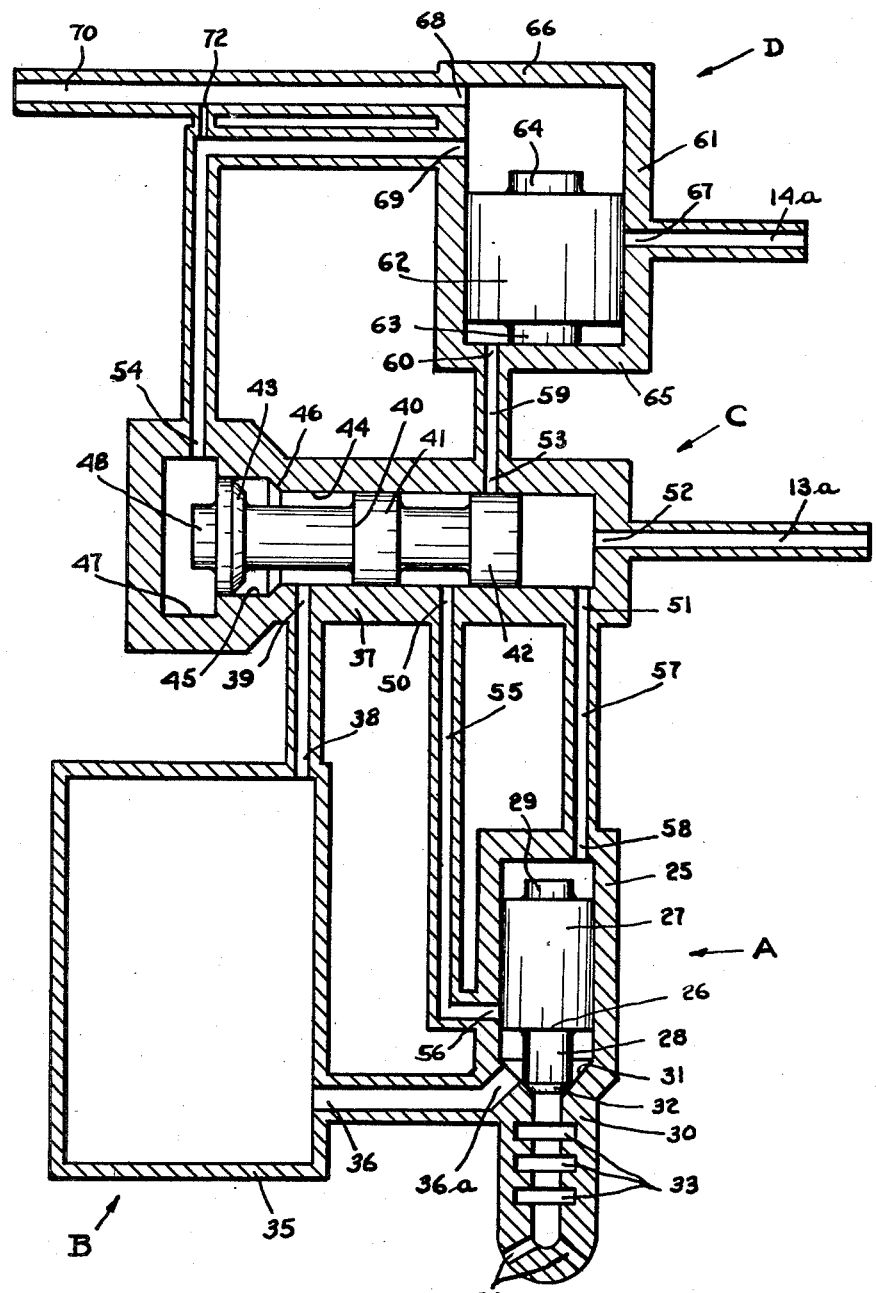

Fig. 3 shows valves 26 and 40 and piston 62 in the positions they assume when the fuel pump has commenced delivery of the next charge of fuel. Injection valve 26 has been forced by fuel pressure, communicated to guide portion 27 through duct 13a, port 52, bore 44, port 51, duct 57 and port 58, to the limit of travel resulting from abutment of valve-face 32 of valve extension 28 against seating 31. In this position of the injection valve 26 the port 56 is closed by guide-portion 27. Shuttle valve 40 is being forced by fuel pressure, communicated to land 42 through duct 13a and port 52, in the direction which unseats the mushroom head 43 from the seating 46. Fuel pressure must be greater than blast vapor pressure since the area of the mushroom head 43 is greater than bore 44 in which land 42 is sliding. Piston 62 is still held by blast vapor pressure in the position as in Fig. 2.

Figure 4:
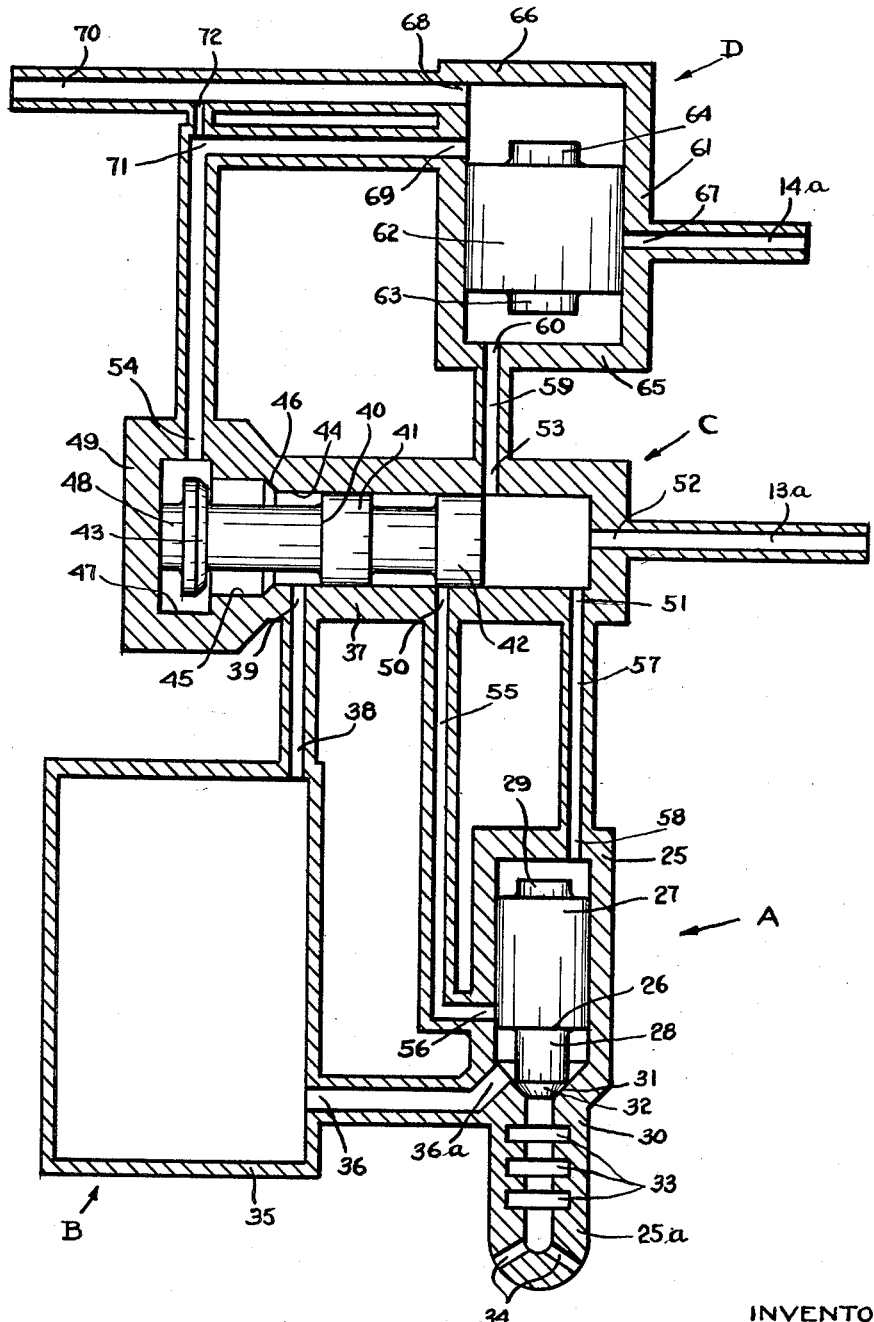

Fig. 4 shows valves 26 and 40 and piston 62 in the positions they assume later in the delivery stroke of the fuel pump. Injection valve 26 is still forced into the position shown in Fig. 3. Shuttle valve 40 has been forced to the limit of travel as permitted by abutment of boss 48 against closure 49. The mushroom head 43 is now clear of counterbore 45 and high pressure blast vapor is admitted to steam accumulator 35 by way of duct 70, ports 68 and 69, duct 71, port 54, counterbores 47 and 45, bore 44, port 39 and duct 38. With the shuttle valve 40 in this position, land 42 has passed port 53 and fuel has been forced into the fuel accumulator by way of duct 13a, port 52, bore 44, port 53, duct 59 and port 60. Piston 62 has been forced by fuel pressure, in excess of blast vapor pressure, to move in the direction remote from closure 65. The distance travelled in this direction by the fuel accumulator piston 62 is determined by the volume of fuel delivered per stroke by the fuel pump. This is the situation just prior to the beginning of an injection through nozzle 25a.

Figure 5:
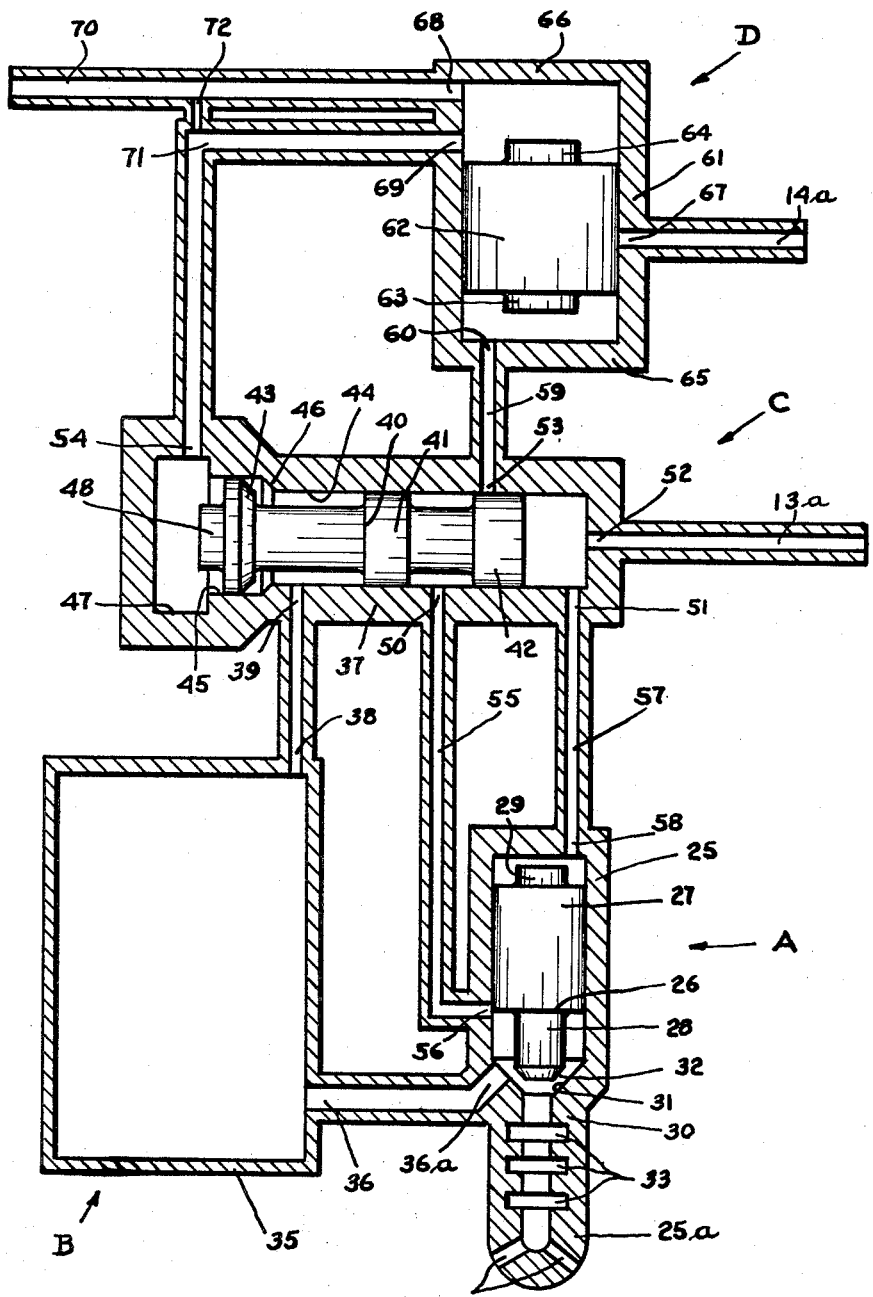

Fig. 5 shows valves 26 and 40 and piston 62 in the transient positions they assume during the initial stages of an injection, the fuel pump having completed its fuel delivery phase and having "unloaded" the duct 13a of pressure and left the way open for a reversal of fuel flow direction through this duct. Blast vapor pressure acting on the differential area of the valve-end of valve 26 causes the unseating of this valve from seat 31 since opposing fuel pressure acting on the opposite end of guide-portion 27 has been removed by the duct-unloading action of the fuel pump. Blast vapor begins to issue from the nozzle 25a. Port 56 has been uncovered but no fuel issues therefrom as yet because land 42 of shuttle valve 40 has not yet uncovered port 53, but valve 40 is moving rapidly in the direction toward abutment of the mushroom head on seat 46 being forced by blast vapor pressure on the large area of the mushroom head and having little opposing fuel pressure on land 42 to resist this motion.

Figure 6:
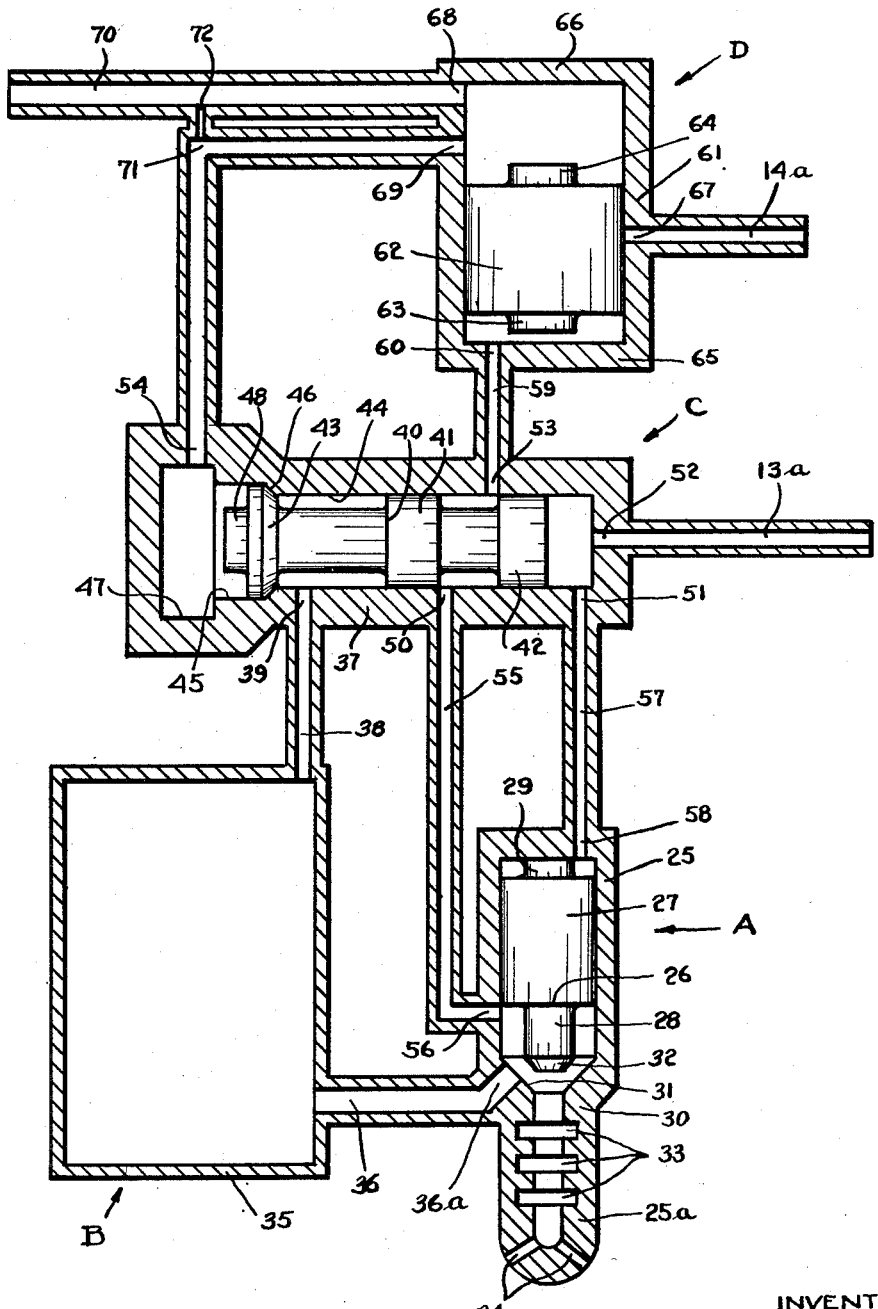

Fig. 6 shows valves 26 and 40 and piston 62 in the positions they assume during the mid-point of injection. Injection valve 26 has moved to the limit prescribed by abutment of boss 29 against the closure or abutment of housing 25 and port 56 is fully uncovered. Shuttle valve 40 has moved to the limit of travel when mushroom head 43 has seated on seat 46 and in this position port 53 has been fully uncovered by land 42. Piston 62 is being forced axially by blast vapor pressure toward the limit where boss 63 abuts closure 65 and fuel is being pumped by piston 62 through port 60, duct 59, port 53, bore 44, port 50, duct 55, port 56 past seat 31, through nozzle 25a and out of orifices 34. At the same time blast vapor which was accumulated in blast vapor accumulator 35 is flowing through duct 36 and port 36a past seat 31 and mixing, under a state of high turbulence, in grooves 33, with the fuel and issues with the fuel through orifices 34. When piston 62 reaches the limit of its travel as shown in Fig. 2, injection is ended and the whole cycle repeats. All these moving parts of the injector assembly, injection valve 26, shuttle valve 40 and fuel accumulator piston 62, are normally thrust in one direction by blast vapor pressure in excess of fuel pressure and in the other direction by fuel pressure in excess of blast vapor pressure. Since the fuel injection pump is capable of delivering pressures greatly in excess of the maximum blast vapor pressure, a seized element will cease movement when substantially at the limit of its travel in the direction in which it is thrust by excess of fuel pressure over blast vapor pressure.

Figure 7:
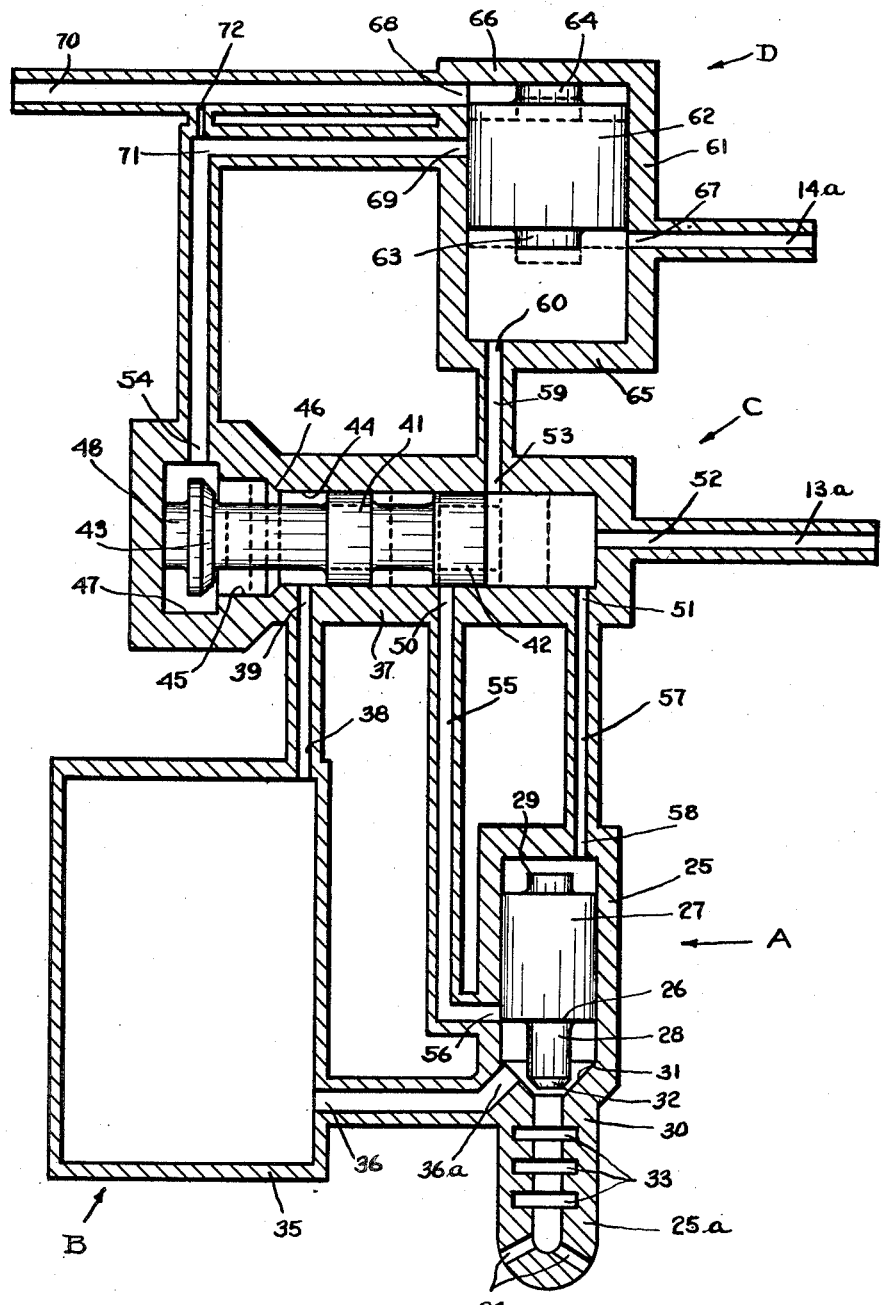

Fig. 7 illustrates the consequences of seizure of injector valve 26. The valve will eventually jam in the position where extension 28 is in contact, or nearly in contact, with seat 31; port 56 will be closed off by guide portion 27 of the valve and fuel will not be able to follow its prescribed normal path along ducts 59 and 55, and fuel accumulator piston 62 will not make a fuel delivery stroke. Successive charges of fuel entering duct 13a from the fuel injection pump will move piston 62 to that end of its travel where boss 64 makes, or nearly makes, contact with closure 66; further charges of fuel entering duct 13a will be rejected by way of duct 14a without giving rise to excessive stresses in the structure of the injector itself or of the fuel injection pump. Piston 62 will reciprocate slightly in response to incoming charges of fuel but will not move, in the direction due to blast vapor thrust, appreciably past the point where overflow port 67 is closed off; furthermore, during the whole of this restricted reciprocation of piston 62, port 69 will remain closed and steam can only reach the blast vapor accumulator 35 and, if valve 26 is not completely seated, the nozzle 25a by way of the constricted passage 72. Shuttle valve 40 will continue to reciprocate but fuel will only flow in one direction, towards the fuel accumulator, through port 53 and there will be no flow through ports 50 or 51. With a seized injector valve, therefore, there will be no fuel passing through the nozzle, and only as much blast vapor will escape as can pass through restricted passage 72.

Figure 8:
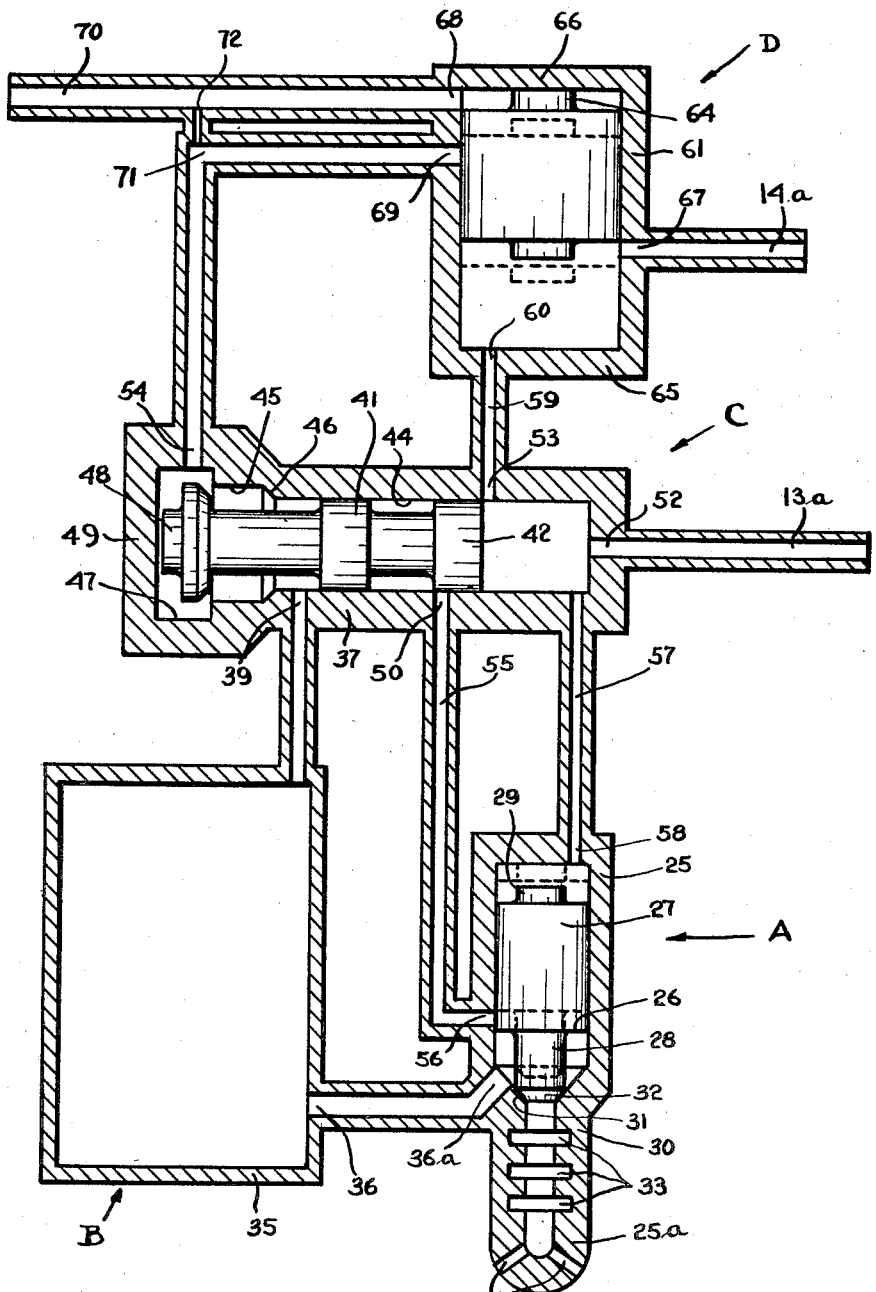

Fig. 8 illustrates the result of a seized shuttle valve 40, which will cease movement when in a position in which boss 48 is in contact, or nearly in contact, with closure 49. Port 50 will be closed off so that no fuel can pass along duct 55 to nozzle 25a. Successive charges of fuel entering duct 13a will thrust fuel accumulator piston to the point in its travel where it closes port 69 and uncovers overflow port 67. Piston 62, in response to successive fuel charges, will reciprocate with limited amplitude substantially as in the case of a seized injector valve shown in Fig. 7. Blast vapor has access to blast vapor accumulator 35 and nozzle 25a only by way of the restricted passage 72. Injector valve 26 will reciprocate throughout its normal range of motion and some blast vapor will issue from the nozzle 25a in each cycle, but no fuel will be discharged through the nozzle 25a because port 50 is closed by land 42 of shuttle valve 40. There will be slightly greater amplitude of reciprocation of piston 62 than in the previous case owing to the active displacement of guide portion 27 of injector valve 26.

Figure 9:
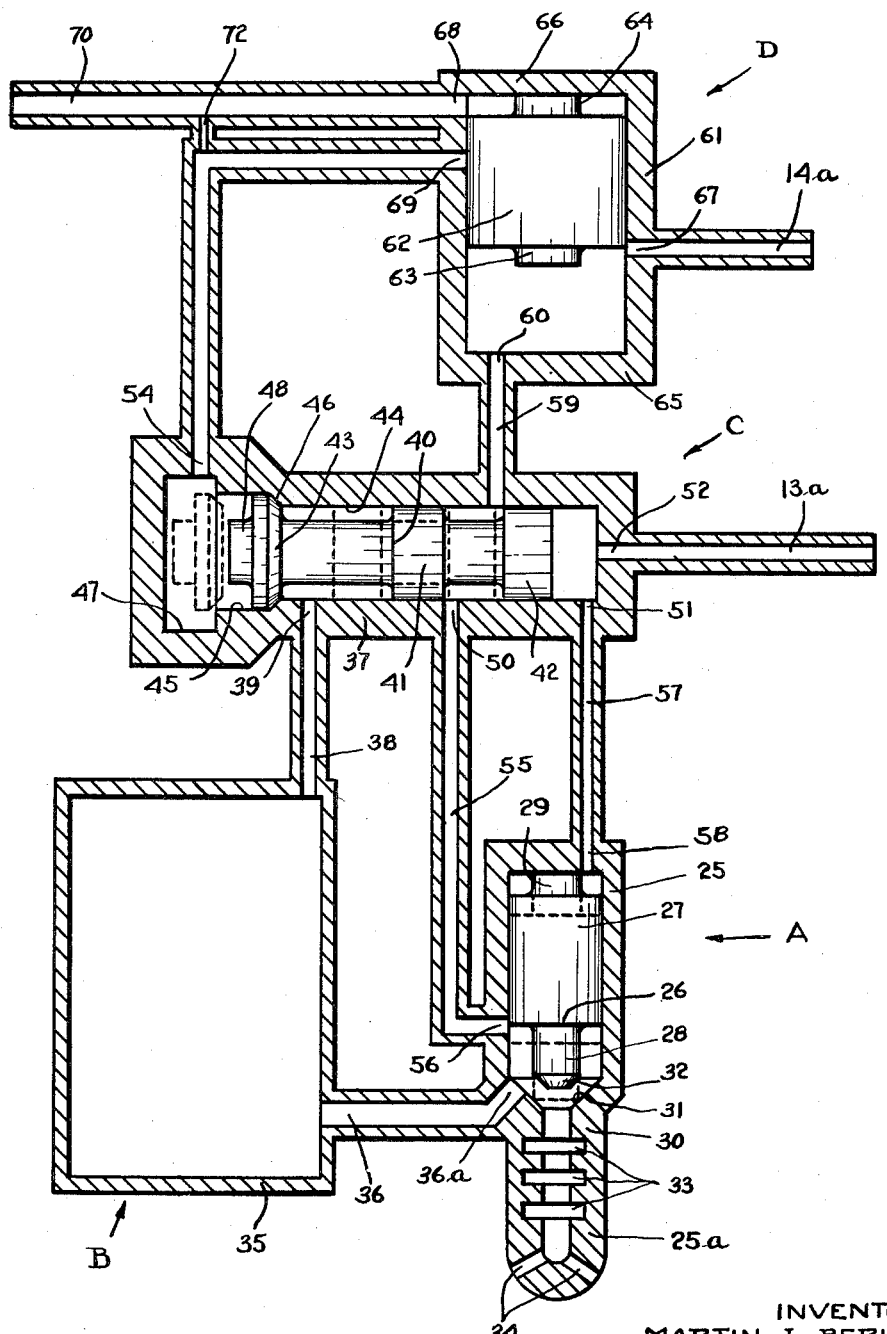

Fig. 9 shows seizure of fuel accumulator piston 62 which will come to rest with boss 64 touching, or nearly touching, closure 66. Port 67 will be partially or fully open and port 69 will be closed. Shuttle valve 40 and injector valve 26 will reciprocate throughout their normal operating ranges of motion. Since piston 62 does not make a delivery stroke, no fuel will issue from nozzle 25a and the only blast vapor which can pass through the nozzle is that which finds its way through constricted passage 72. Charges of fuel entering duct 13a from the fuel injection pump will escape by way of overflow port 67 without giving rise to abnormal stresses in the injector structure or the fuel injection pump or its operating mechanisms.

Figure 10:
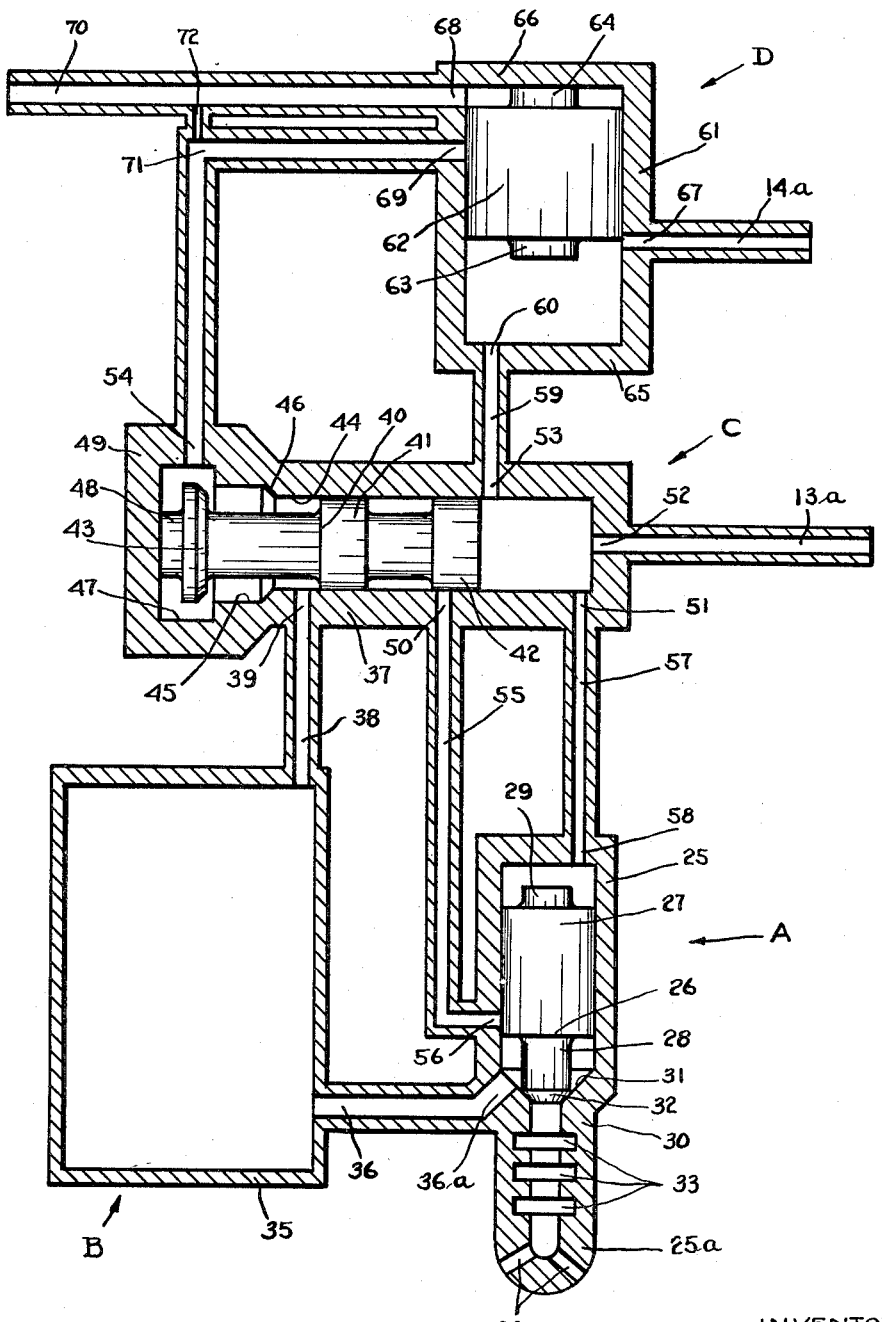

Fig. 10 represents the case where there is no blast vapor supply to an injector assembly but the engine is turning and the fuel injection pump is delivering charges of fuel in the normal manner. Such a condition might arise out of an attempt to start the engine without first providing blast vapor under pressure, or the source of blast vapor might fail while the engine is running; in any event it is undesirable to "flood" the engine cylinders with fuel which has not been injected in the form of a spray since fuel so introduced will not burn properly and may foul the engine.

When there is no blast vapor pressure in duct 70, fuel entering duct 13a will thrust shuttle valve 40 to the limit of its travel at which boss 48 abuts closure 49 and injector valve 25a will move to the limit of travel where it seats on seat 31. Fuel accumulator piston 62 will move to the limit where boss 64 makes contact with closure 66 and no further movements of these three components will take place until blast vapor pressure is re-established in duct 70.

All fuel entering duct 13a will pass out of the injector assembly through overflow port 67. Establishment of steam pressure in duct 70 will give rise to blast vapor flow through restricted duct 72 and this will cause the shuttle valve to move to the other end of its travel between delivery strokes of the fuel injection pump, when fuel pressure in duct 13a is relieved, and fuel accumulator piston 62 will be enabled to force fuel, by way of ducts 59 and 55 to nozzle 25a; port 69 will then be uncovered; port 67 will be closed and normal functioning of the system will be reestablished.

The purpose of duct 72 is to permit this reestablishment of normal functioning if, for any cause, the moving parts of the injector assembly should come to rest in the combination of positions as shown in Fig. 10—which would happen if any engine operator shut the blast vapor supply off before stopping the engine; it might also occur if the engine were left standing without operation for a period of time with some residual pressure, such as gravity head, of fuel in duct 13a.

In Figs. 11 to 22 inclusive there is shown the preferred form of execution of the invention. In this form of the invention the parts thereof corresponding to those shown in the diagrammatic drawings have been correspondingly numbered as far as practicable for convenience in referring to those views in the drawings.

In the preferred form there is provided a hollow cylindrical housing 73 having an opening at one end through which the nozzle 30 protrudes while the opening at its other end is adapted to be closed by a member 74 which serves other functions also as hereinafter described; the closure member 74 is retained in position in housing 73 by means of male and female screw threads 76 and 75 respectively.

Within the housing 73 are positioned the enlarged flange portion 30A of nozzle 30 on which is formed the flat joint face 31, the injection valve housing 25 on which are formed the flat joint faces 32 and 33, the shuttle valve housing 27 on which are formed flat joint faces 34 and 77, the valve stop 49 on which are formed flat joint faces 78 and 65, and fuel accumulator housing 61 which is integral with closure member 74 and on which is formed flat joint face 66. Housing 73 is provided with an inwardly turned shoulder 73A which engages the enlarged flange portion 30A of nozzle 30. By tightening up screw threads 75 and 76 an axial force is created which presses all the mating pairs of flat joint faces into mutual abutment and sealing contact.

The blast vapor accumulator 35 is formed integrally with the injection valve housing 25 and is of annular shape, the fuel duct 79 is located axially in a central boss 80 in the blast vapor accumulator 35.

The injection valve 26 is of the differential type having a guide portion 27, of greater diameter than valve face extension 28, and which is also provided with an annular circumferential groove 29 which registers with fuel port 56 when valve 26 is fully lifted and is abutting face 34 of shuttle valve housing 37. Radial ducts 81 are provided for passage of fuel from annular groove 29 to the central duct 82 which has its discharge end opening axially out of the end of valve face extension 28.

Blast vapor from accumulator 35 passes through duct 36 and port 36A to annular chamber 36B which surrounds valve face extension 28. When the injection valve 26 is lifted off valve seat 25A in injection valve housing 25 blast vapor passes down duct 79 to nozzle 30 mixing with fuel issuing from duct 82.

Shuttle valve 40 is provided with a spring 83 which urges it into seated position. When valve 40 is seated fuel passes from fuel accumulator 84 by way of port 60, duct 59, and port 53, between cylindrical lands 41 and 42 of shuttle valve 40, through port 59, duct 55 and port 56, to groove 29, radial ducts 81, and axial duct 82 of injection valve 26, and so to the nozzle 30.

Fuel under pressure entering the injector through duct 90 and port 91 forces injection valve 26 into seating contact with seating face 25A of injection valve housing 25 and forces shuttle valve 40 into its open position where shuttle valve extension 48 contacts valve stop 49 when fuel passes through the lower part of bore 37A of shuttle valve housing 37 and flows through port 53, duct 59 and port 60 into fuel accumulator 84, displacing fuel accumulator piston 62 by an amount corresponding with the volume of fuel delivered from the fuel pressure source.

Blast vapor entering from its pressure source by way of duct 70 and port 68 acts to resist the displacement by fuel pressure of fuel accumulator piston 62. After passing through enlarged portion 84A of the bore of fuel accumulator 84 the blast vapor passes through portion 85 of the bore of fuel accumulator 84 which portion is of the same diameter as that portion of the bore in which piston 62 normally operates. The blast vapor then passes into a second enlarged portion 84B of the bore of fuel accumulator 84 thence through ducts 88 in valve stop 49 through spring chamber 89 of shuttle valve housing 37, through the upper portion of bore 37A of shuttle valve housing 37, through port 39 and duct 36 to blast vapor accumulator 35.

Under certain conditions of operation or of malfunctioning it is possible for fuel accumulator piston 62 to be forced into an extreme position where it makes abutting contact with valve stop 49. When this takes place fuel return port 67 is uncovered by piston 62 and fuel passes through 67 and along fuel return duct 92 and back to the fuel tank.

When piston 62 is in contact with valve stop 49 piston 62 is also engaged in portion 85 of the bore of fuel accumulator 84. This substantially cuts off access of blast vapor to spring chamber 89 and remaining elements of the blast vapor tract. In order to provide a path for blast vapor to reach the underside of piston 62 and return it to normal operation when the malfunctioning has been rectified restricted passages 86 and 87, in the form of small grooves, are provided in the lower edge 64 of piston 62 and the inner periphery of portion 85 of the bore of fuel accumulator 84, respectively.

The flow capacity of restricted passages 86 and 87 is adequate to re-establish normal functioning of the fuel accumulator piston 62 but is not sufficient to permit loss of blast vapor to an undesirable degree should malfunctioning of one or more injectors of a multi-cylinder engine persist while the engine continues to operate on the cylinders which are still working properly.

In this embodiment of the invention the diameter of the guide portion 27 of injection valve 26 is larger than bore 37A of shuttle valve housing 37 so that the limit of opening travel of injection valve 26 is determined by contact of the end surface 26A of injection valve 26 with flat face 34 of shuttle valve housing 37, thus in this embodiment is performed the function of travel limiting boss 29 as shown in the diagrammatic Figs. 2 to 10 inclusive.

Also, in this embodiment of the invention, limiting travel in one direction of fuel accumulator piston 62 is determined by contact of the lower edge 64 of piston 62 with flat face 65 of valve stop 49 performing the function, which in the diagrammatic Figs. 2 to 10 inclusive, was shown as being effected by contact of travel limiting boss 64 with the closure 66.

It will be noted that in the construction of the present invention, that because of the arrangement whereby a single duct is made to perform dual service in each of two cases, one for fuel and one for blast vapor, that the construction is thereby simplified in that the number of ducts is reduced to a minimum. In order to accomplish this simplicity of construction, the two surfaces of the valves operated by fuel pressure are located in a common pressure chamber served by a single fuel duct and similarly the surface of the shuttle valve and the surface of the fuel accumulator piston which require blast vapor pressure for their actuation are disposed in a common pressure chamber served by a single duct.

By the use of the method and apparatus of the present invention, it is possible to obtain a desired degree of dispersion and penetration of fuel particles into the combustion chamber of the engine with materially lower pressures than are necessary to secure the same result with presently employed so-called "solid injection" apparatus. The pumping of liquids containing suspended solid particles has previously resulted in serious erosion of the fuel injection equipment if the pressures are high such as 5000 lbs. p. s. i. and higher, whereas with pressures of 3000 lbs. p. s. i. or lower the abrasive effect of the solid particles is inconsiderable. The pressures contemplated with the present invention are a maximum of 1500 lbs. p. s. i.

One typical example of pressures which may be employed are, blast vapor pressure of 1000 lbs. p. s. i., fuel peak pressure approximately 1200 lbs. p. s. i., maximum combustion pressure in the engine approximately 800 lbs. p. s. i.

The method and apparatus of the present invention may be employed with compression ignition engines and spark ignition engines with the same advantages.

Superheated steam may be employed in order that, where a heavy liquid fuel is employed, the fuel will be evaporated by the superheated steam as it enters the combustion chamber of the engine, and where a suspension of solid fuel particles in a liquid vehicle is employed, the superheated steam will evaporate the liquid vehicle so that the solid particles of fuel may be in a dry state when introduced to the air in the engine combustion chamber. Also, the use of water vapor tends to reduce ignition lag.

From the foregoing it will be seen that I have provided simple, efficient and economical means for obtaining all of the objects and advantages of the invention.

I claim:

1. In a device of the character described, a hollow housing having a nozzle secured adjacent one end thereof and a closure member secured adjacent the opposite end thereof and having ducts for connection to sources of vapor and fuel, an injection valve housing and a shuttle valve housing in alignment in said hollow housing between said nozzle and said closure member, a vapor accumulator in said injection valve housing, a fuel accumulator in said closure member, vapor and fuel ducts in said injection valve housing and said shuttle valve housing and connecting said nozzle with said vapor and fuel sources through said accumulators to supply vapor and fuel from said accumulators to said nozzle, an injection valve in said valve housing communicating with said vapor and fuel accumulators, said injection valve being opened by vapor pressure to control the passage of vapor and fuel to said nozzle and a shuttle valve in said shuttle valve housing for controlling the passage of vapor to said vapor accumulator and the passage of fuel to said injection valve and said fuel accumulator.

2. In a device of the character described, a hollow housing having a nozzle secured adjacent one end thereof and a closure member secured adjacent the opposite end thereof and having ducts for connection to sources of vapor and fuel, an injection valve housing and a shuttle valve housing in alignment in said hollow housing between said nozzle and said closure member, a vapor accumulator in said injection valve housing, a fuel accumulator in said closure member, vapor and fuel ducts in said injection valve housing and said shuttle valve housing and connecting said nozzle with said vapor and fuel sources through said accumulators to supply vapor and fuel from said accumulators to said nozzle, an injection valve in said valve housing communicating with said vapor and fuel accumulators, said injection valve being opened by vapor pressure to control the passage of vapor and fuel to said nozzle, a shuttle valve in said shuttle valve housing for controlling the passage of vapor to said vapor accumulator and the passage of fuel to said injection valve and to said fuel accumulator, said injection valve housing being adjacent said nozzle and a valve stop member between said closure member and said shuttle valve housing and adapted to limit the travel in one direction of the fuel accumulator piston.

3. In a device of the character described, a hollow housing having a nozzle secured adjacent one end thereof and a closure member secured adjacent the opposite end thereof and having ducts for connection to sources of vapor and fuel, an injection valve housing and a shuttle valve housing in alignment in said hollow housing between said nozzle and said closure member, a vapor accumulator in said injection valve housing, a fuel accumulator in said closure member, vapor and fuel ducts in said injection valve housing and said shuttle valve housing and connecting said nozzle with said vapor and fuel ducts in said closure member to supply vapor and fuel from said accumulators to said nozzle, an injection valve in said valve housing communicating with said vapor and fuel accumulators and opened by vapor pressure to control the passage of vapor and fuel to said nozzle, a shuttle valve in said shuttle valve housing for controlling the passage of vapor to said vapor accumulator and the passage of fuel to said injection valve and fuel accumulator, said injection valve housing being positioned adjacent said nozzle and flat joint surfaces between said injection valve housing and said shuttle valve housing, and between said shuttle valve housing and said closure member.

4. In a device of the character described, a hollow housing having an internal shoulder adjacent one end thereof, a nozzle having a portion engaging said shoulder and a portion extending out of said housing, an injection valve section in said housing and engaging said nozzle and having a vapor accumulator, a differential type injection valve in said injection valve housing section, a shuttle valve housing section in said housing and engaging said injection valve housing section, a reciprocable shuttle valve in said shuttle valve housing section, a closure member secured to said hollow housing adjacent the end thereof, a fuel accumulator in said closure member, said closure member having ducts for connection to sources of fuel and vapor and communicating with said fuel accumulator, a vapor duct connecting said fuel accumulator and said vapor acumulator and controlled by said shuttle valve, a duct connecting said vapor accumulator and said injection valve whereby said valve will be opened by vapor pressure, a fuel duct connecting said fuel accumulator with said injection valve and controlled by said shuttle valve and a duct connecting said injection valve and said nozzle to allow the passage of both vapor and fuel to said nozzle.

5. In a device of the character described, a hollow housing having an internal shoulder adjacent one end thereof, a nozzle having a portion engaging said shoulder and a portion extending out of said housing, an injection valve section in said housing and engaging said nozzle and having a vapor accumulator, a differential type injection valve in said injection valve housing section, a shuttle valve housing section in said housing and engaging said injection valve housing section, a reciprocable shuttle valve in said shuttle valve housing section, a closure member secured to said hollow housing adjacent the end thereof, a fuel accumulator in said closure member, said closure member having ducts for connection to sources of fuel and vapor and communicating with said fuel accumulator, a vapor duct connecting said fuel accumulator and said vapor accumulator and controlled by said shuttle valve, a duct connecting said vapor accumulator and said injection valve whereby said valve will be opened by vapor pressure, a fuel duct connecting said fuel accumulator with said injection valve and controlled by said shuttle valve and a duct connecting said injection valve and said nozzle to allow the passage of both vapor and fuel to said nozzle and flat joint surfaces between said injection valve housing and said shuttle valve housing and between said shuttle valve housing and said closure member.

6. In a device of the character described, a hollow cylindrical housing, a nozzle secured to said housing adjacent one end thereof, a closure member secured to said housing adjacent the opposite end thereof, fuel and vapor ducts in said closure member for connection with sources of fuel and vapor respectively, said fuel and vapor ducts also communicating with said nozzle, three aligned bores in said housing, a reciprocable injection valve in one of said bores, said valve being opened by vapor pressure and controlling the passage of fuel and vapor through said ducts to said nozzle from said accumulators, a reciprocable shuttle valve in another of said bores and controlling the passage of vapor and fuel to said injection valve and a reciprocable fuel accumulator valve in the third bore and controlling the passage of fuel and vapor to said shuttle valve.

7. In a device of the character described, a hollow cylindrical housing, a nozzle secured to said housing adjacent one end thereof, a closure member secured to said housing adjacent the opposite end thereof, fuel and vapor ducts in said closure member for connection with sources of fuel and vapor respectively, said fuel and vapor ducts also communicating with said nozzle, three aligned bores in said housing, a reciprocable injection valve in one of said bores, said valve being opened by vapor pressure and control the passage of fuel and vapor through said ducts to said nozzle, a reciprocable shuttle valve in another of said bores and controlling the passage of vapor and fuel to said injection valve and a reciprocable fuel accumulator valve in the third bore and controlling the passage of fuel and vapor to said shuttle valve and spring means urging said shuttle valve in one direction.

8. In a device of the character described, a hollow cylindrical housing, a nozzle secured to said housing adjacent one end thereof, a closure member secured to said housing adjacent the opposite end thereof, fuel and vapor ducts in said closure member for connection with sources of fuel and vapor respectively, said fuel and vapor ducts also communicating with said nozzle, three housing sections in alignment in said cylindrical housing, aligned bores in each of said housing sections, a reciprocable injection valve in one of said bores, said valve being opened by vapor pressure and controlling the passage of fuel and vapor through said ducts to said nozzle, a reciprocable shuttle valve in another of said bores and controlling the passage of vapor and fuel to said injection valve and a reciprocable fuel accumulator valve in the third bore and controlling the passage of fuel and vapor to said shuttle valve.

9. In a device of the character described, a cylindrical hollow housing having a section having a fuel accumulator having an inlet passage for connection to a source of fuel and a passage for connection to a source of vapor, a piston in said fuel accumulator and having opposed pressure responsive surfaces to be acted upon by vapor and fuel pressure respectively, a section aligned with said fuel accumulator section and having an injection valve, a vapor accumulator connected to said source of vapor and to said injection valve by passageways for supplying vapor to said injection valve, a fuel passageway connecting said fuel accumulator and said injection valve and a section having a shuttle valve connected to said fuel passageway intermediate said fuel accumulator and said injection valve and also with said vapor passageway intermediate said source of vapor and said vapor accumulator, said shuttle valve having opposed pressure responsive surfaces acted upon by vapor and fuel respectively, said shuttle valve being actuated by coordinated changing pressure conditions in the fuel and vapor on the respective pressure responsive surfaces of said shuttle valve to control the delivery of fuel to said injection valve and vapor to said vapor accumulator, and said injection valve section having a valve member having opposed pressure responsive surfaces acted upon by vapor and fuel respectively, said sections being of substantially similar diameter and having flat joining surfaces.

10. In a device of the character described, a cylindrical hollow housing having a section having a fuel accumulator having an inlet passage for connection to a source of fuel and a passage for connection to a source of vapor, a piston in said fuel accumulator, said piston having opposed pressure responsive surfaces, one of said surfaces being acted upon by vapor and the other of said surfaces being acted upon by fuel, a second section having an injection valve, a vapor accumulator in said section and connected to said source of vapor and to said injection valve by passageways for supplying vapor to said injection valve, a fuel passageway connecting said fuel accumulator and said injection valve and a third section having a shuttle valve connected to said fuel passageway intermediate said fuel accumulator and said injection valve and also with said vapor passageway intermediate said source of vapor and said vapor accumulator, said shuttle valve having opposed pressure responsive surfaces, one of said surfaces being acted upon by vapor and the other of said surfaces being acted upon by fuel, said shuttle valve being actuated by coordinated changing pressure conditions in the fuel and vapor on the respective pressure responsive surfaces of said shuttle valve to control the delivery of fuel to said injection valve and vapor to said vapor accumulator, said injection valve having a valve member having opposed pressure responsive surfaces, one of said surfaces being acted upon by vapor and the other of said surfaces being acted upon by fuel, said sections being of substantially similar diameter and having flat joining surfaces.

11. In a device of the character described, a cylindrical hollow housing having a section having a fuel accumulator having an inlet passage for connection to a source of fuel and a passage for connection to a source of vapor, a piston in said fuel accumulator and having opposed pressure responsive surfaces to be acted upon by vapor and fuel pressure respectively, a second section having an injection valve, a vapor accumulator in said section connected to said source of vapor and to said injection valve by passageways for supplying vapor to said injection valve, a fuel passageway connecting said fuel accumulator and said injection valve and a third section having a shuttle valve connected to said fuel passageway intermediate said fuel accumulator and said injection valve and also with said vapor passageway intermediate said source of vapor and said vapor accumulator, said shuttle valve having opposed pressure responsive surfaces to be acted upon by vapor and fuel respectively, said shuttle valve being actuated by coordinated changing pressure conditions in the fuel and vapor on the respective pressure responsive surfaces of said shuttle valve to control the delivery of fuel to said injection valve and vapor to said vapor accumulator, and said injection valve having a valve member having opposed pressure responsive surfaces to be acted upon by vapor and fuel respectively and a fuel passage for supplying fuel to said injection valve for delivery to a combustion chamber, said sections being of substantially similar diameter and having flat joining surfaces.

12. In a device of the character described, a hollow housing, a nozzle adjacent one end of said housing, a closure adjacent the opposite end of said housing, fuel and vapor ducts in said closure for connection to sources of fuel and vapor respectively, a vapor accumulator, an injection valve, a shuttle valve and a fuel accumulator piston in aligned relation in said housing, said injection valve and said shuttle valve having pressure responsive surfaces to be acted upon by fuel pressure with said surfaces being located in a common pressure chamber, said shuttle valve and said fuel accumulator piston having surfaces acted upon by vapor pressure with said surfaces being located in a common pressure chamber and fuel and vapor ducts connecting said pressure chambers to said vapor and fuel ducts for communication with sources of vapor and fuel respectively.

13. In a device of the character described, a hollow housing, a nozzle adjacent one end of said housing, a closure adjacent the opposite end of said housing, fuel and vapor ducts in said closure for connection to sources of fuel and vapor respectively, a vapor accumulator, an injection valve, a shuttle valve and a fuel accumulator piston in aligned relation in said housing, said injection valve and said shuttle valve having pressure responsive surfaces to be acted upon by fuel pressure with said surfaces being located in a common pressure chamber, said shuttle valve and said fuel accumulator piston having surfaces to be acted upon by vapor pressure with said surfaces being located in a common pressure chamber, a single fuel duct connecting said pressure chamber for said shuttle valve and said fuel accumulator piston with said fuel duct in said closure and a single vapor duct connecting said pressure chamber for said injection valve and said shuttle valve with said vapor duct in said closure.

14. In a device of the character described, a hollow housing, a nozzle adjacent one end of said housing, a closure adjacent the opposite end of said housing, fuel and vapor ducts in said closure for connection to sources of fuel and vapor respectively, a vapor accumulator, an injection valve, a shuttle valve and a fuel accumulator piston in aligned relation in said housing, said injection valve and said shuttle valve having pressure responsive surfaces to be acted upon by fuel pressure with said surfaces being located in adjacent relation in a common pressure chamber, said shuttle valve and said fuel accumulator piston having surfaces to be acted upon by vapor pressure with said surfaces being located in adjacent relation in a common pressure chamber and fuel and vapor ducts connecting said pressure chambers to said vapor and fuel ducts for communication with sources of vapor and fuel respectively, a single fuel duct connecting said pressure chamber for said shuttle valve and said fuel accumulator piston with said fuel duct in said closure and a single vapor duct connecting said pressure chamber for said injection valve and said shuttle valve with said vapor duct in said closure.

15. In a device of the character described, a hollow housing, a nozzle adjacent one end thereof, a closure adjacent the opposite end of said housing, fuel and vapor ducts in said closure for connection to sources of fuel and vapor respectively, a vapor accumulator section in said housing adjacent said nozzle, an injector nozzle in said vapor accumulator section, a shuttle valve section adjacent said vapor accumulator section, a shuttle valve in said shuttle valve section, a fuel accumulator section in said housing adjacent said closure and having a fuel accumulator piston, said injection valve and said shuttle valve having pressure responsive surfaces to be acted upon by fuel pressure with said surfaces being located in a common pressure chamber, said shuttle valve and said fuel accumulator piston having surfaces to be acted upon by vapor pressure with said surfaces being located in a common pressure chamber and fuel and vapor ducts connecting said pressure chambers to said vapor and fuel ducts for communication with sources of vapor and fuel respectively.

References Cited in the file of this patent

UNITED STATES PATENTS

| Number | Name | Date |
| --- | --- | --- |
| 1,586,006 | Rochefort | May 25, 1926 |
| 2,552,679 | Hogeman | May 15, 1951 |